United States Patent
Huber et al.

(10) Patent No.: US 11,121,608 B2
(45) Date of Patent: Sep. 14, 2021

(54) DISCHARGING DEVICE FOR DISCHARGING ELECTRICAL INTERFERENCE

(71) Applicant: SCHUNK CARBON TECHNOLOGY GMBH, Bad Goisern (AT)

(72) Inventors: Florian Huber, Bad Ischl (AT); Markus Weber, Bad Goisern (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 313 days.

(21) Appl. No.: 16/318,850

(22) PCT Filed: Jul. 21, 2017

(86) PCT No.: PCT/EP2017/068516
§ 371 (c)(1),
(2) Date: Jan. 18, 2019

(87) PCT Pub. No.: WO2018/019725
PCT Pub. Date: Feb. 1, 2018

(65) Prior Publication Data
US 2019/0199180 A1 Jun. 27, 2019

(30) Foreign Application Priority Data
Jul. 26, 2016 (DE) .................... 10 2016 213 653.4

(51) Int. Cl.
*H02K 11/40* (2016.01)
*H01R 39/38* (2006.01)
*H01R 39/20* (2006.01)
*H02K 5/22* (2006.01)

(52) U.S. Cl.
CPC ............ *H02K 11/40* (2016.01); *H01R 39/20* (2013.01); *H01R 39/381* (2013.01); *H02K 5/225* (2013.01)

(58) Field of Classification Search
CPC .......... H02K 11/40; H02K 5/22; H02K 5/225; H01R 39/20; H01R 39/381; H01R 39/42; H01R 39/44
See application file for complete search history.

(56) References Cited

U.S. PATENT DOCUMENTS 3,984,716 A * 10/1976 Stark ................. H02K 9/28
310/232
5,144,181 A * 9/1992 Shibuya ................. C04B 35/52
252/502

(Continued)

FOREIGN PATENT DOCUMENTS

CN 103607074 A 2/2014
CN 205105052 U 3/2016
(Continued)

OTHER PUBLICATIONS

WO-2004023609-A1 machine translation Jan. 30, 2021.*

*Primary Examiner* — Tran N Nguyen
*Assistant Examiner* — Leda T Pham
(74) *Attorney, Agent, or Firm* — Dickinson Wright PLLC; Andrew D. Dorisio

(57) ABSTRACT

A discharging device for discharging electrical interference, in particular currents, from a rotor part of a machine, said rotor part in particular being a shaft, into a stator part (17) of the machine, the discharging device having a contact device (11) comprising a contact element (13) which is accommodated in an axially displaceable manner in a guide and which is acted on by a contact force device (15) for generating a shaft contact force ($F_W$) in order to establish electrical contact between a shaft contact surface (19) of the contact element (13) and a rotor contact surface (20) of the shaft (18), wherein the guide has a stator contact surface (25) for forming an electrical connection with the stator part (17) and the discharging device has a guide contact force device (Continued)

(21) for generating a guide contact force ($F_F$) between a guide contact surface (24) of the contact element (13) and the stator contact surface (25) electrically connected to the stator part (17).

18 Claims, 4 Drawing Sheets

(56) References Cited

U.S. PATENT DOCUMENTS

| | | | | | |
|---|---|---|---|---|---|
| 5,696,418 | A | * | 12/1997 | Corbach | ............. H01R 39/385 |
| | | | | | 310/239 |
| 7,554,239 | B2 | * | 6/2009 | Suzuki | ................. H01R 39/381 |
| | | | | | 310/239 |

FOREIGN PATENT DOCUMENTS

| | | |
|---|---|---|
| DE | 1931104 U | 1/1966 |
| DE | 2944065 A1 | 5/1981 |
| DE | 3217217 A1 | 12/1982 |
| DE | 3240709 A1 | 5/1984 |
| DE | 19549195 A1 | 7/1997 |
| DE | 10241382 A1 | 3/2004 |
| DE | 102007019828 B3 | 10/2008 |
| DE | 102013212062 A1 | 1/2015 |
| EP | 0304528 A2 | 3/1989 |
| JP | 2002315270 A | 10/2002 |
| WO | WO9701200 A1 | 1/1997 |
| WO | WO-2004023609 A1 * | 3/2004 ............. H02K 23/18 |

* cited by examiner

DISCHARGING DEVICE FOR DISCHARGING ELECTRICAL INTERFERENCE

BACKGROUND OF THE INVENTION

The present invention relates to a discharging device for discharging electrical interference, in particular currents, from a rotor part of a machine, said rotor part in particular being a shaft, to a stator part of the machine, the discharging device having a contact device comprising a contact element which is accommodated in a guide in an axially displaceable manner and which is acted on by a contact force device for generating a shaft contact force in order to establish electrical contact between a shaft contact surface of the contact element and a rotor contact surface of the shaft.

Discharging devices of the kind mentioned above are known in various embodiments from the state of the art. In particular, the use of carbon brushes disposed on a ring, radially distributed around a shaft, and being in contact with a stator via connecting wires to discharge low-frequency direct currents is known. Owing to their low electrical resistance, the carbon brushes, which are accommodated in a guide, allow direct discharge of the currents and can thus help avoid having to conduct the currents via bearing points of the shaft, which might otherwise cause surface damage to the bearing bodies or bearing rings when locally high current densities occur because of welded spots.

Above and hereinafter, the term "shaft" is used as a synonym for the term "rotor part". Hence, the term "shaft" refers to all rotating machine parts via which currents can be discharged into a stator part.

The known discharging devices are typically employed in railway technology, where the primarily introduced low-frequency alternating current or rectified working current flows off via the wheel axles. On account of the increasing electrification in the automotive sector, such as in the form of electric drive motors for hybrid cars or purely electrically powered cars, similar measures that allow currents to be discharged are required. Unlike in railway technology, continuously fluctuating alternating voltages or currents occur between motor drive shafts or gear units connected thereto or other functional components and the static components of automobiles. In addition to the eddy currents axially induced in metallic components, high-frequency potential fluctuations in a very wide frequency range from 1 kHz to some 100 MHz often occur between the rotating components and the stationary components in automobiles. This is accompanied by interference on electronic devices such as radio receivers in the vicinity due to emission of these frequencies via the shafts or the axles (antenna effect). Moreover, vehicle manufacturers are required to comply with the corresponding legal provisions regarding allowed emissions of electromagnetic radiation.

SUMMARY OF THE INVENTION

Therefore, the object of the present invention is to propose a discharging device that is particularly suitable for discharging eddy currents and electromagnetic radiation from rotating components into stationary components of a machine.

To attain said object, the guide of the discharging device according to the invention has a stator contact surface for forming an electrical connection with the stator part, and the discharging device has a guide contact force device for generating a guide contact force between a guide contact surface of the contact element and the stator contact surface of the guide.

Accordingly, the contact element, which is preferably a molded carbon body, is accommodated in a guide of the contact device in an axially displaceable manner, the contact force device pushing a shaft contact surface of the contact element against a rotor contact surface of the shaft similar to a pre-loading device of a carbon brush formed by a spring. In the case of the discharging device according to the invention, it is ensured that not only a shaft contact force for establishing electric contact with the shaft is generated by means of the contact force device, but also a guide contact force, which ensures that electrical contact is established between a guide contact surface of the contact element and the stator contact surface, which is electrically connected to the stator.

The contact force device ensures that two different contact surfaces are formed on the contact element, namely the shaft contact surface and the guide contact surface of the contact element, which means that parallel to contact with the shaft, electrical contact is also established between a circumferential surface of the contact element and the stator contact surface of the guide, which is electrically connected to the stator.

In the invention, use is made of the knowledge that alternating currents in a conductor through which electricity is flowing are transmitted less and less through the volume of the conductor as the frequency grows; instead, they tend to concentrate in the edge zones of the conductor adjacent to the surfaces of the conductor. This phenomenon is also referred to as the skin effect, which occurs in particular when electrical energy is transmitted by means of electromagnetic waves, meaning that according to the edge-zone concentration described above, only a small part of the electromagnetic energy enters the conductor volume in the form of electrical and magnetic fields and an energy maximum occurs in the edge zones. The fact that the guide contact surface is formed at an edge zone, i.e. at the circumferential surface of the contact element, by the contact element being appropriately acted on by the guide contact force device to establish electrical contact between the guide contact surface or circumferential surface of the contact element and the guide, leads to the formation of a shortest possible discharging path of the interference from the shaft into the stator, i.e. into the ground of the electrical system. In this way, eddy currents on the one hand and high-frequency interference on the other hand are introduced into the stator directly via the contact element, allowing in particular electromagnetic emission effects, i.e. the emission of electromagnetic radiation, to be prevented or their extent to be at least significantly reduced.

According to a preferred embodiment, the contact force device has a pre-loading device disposed on a base of the guide and thus corresponds to the contact force devices commonly provided on carbon brush assemblies, making it possible to also use a conventionally configured guide in which the pre-loading device is supported between the contact element and a base of the guide when designing a discharging device according to the invention. The base can be formed directly on the guide or can be formed by a base plate or the like on which the guide is formed or mounted.

If the guide is a contact sleeve having two diametrically opposed wall portions, a first wall portion being provided with the guide contact device and the opposite second wall portion being a stator contact surface, the guide of the discharging device according to the invention can be produced based on a conventional guide retrofitted with a guide contact force device.

For this purpose, in one embodiment of the guide contact force device, the first wall portion can preferably be provided with a spring tab which is in elastic contact with the contact element. Hence, when selecting appropriate materials for forming the contact sleeve, the guide contact force device can be realized simply by providing the first wall portion with an approximately U-shaped perforation and bending open a tab thus formed in the wall portion so as to form a protrusion protruding from the wall portion.

Notwithstanding the configuration of the guide contact force device explained above as being formed in a wall portion of the guide sleeve in such a manner that the guide contact force device is independent of the contact force device, which in this case merely serves to generate the shaft contact force between the shaft contact surface of the contact element and the shaft, a guide contact force device can alternatively be formed by realizing the guide as a contact sleeve and making the contact force device act on the contact element with a pre-loading force oriented at an angle to the longitudinal axis of the contact element, the contact force device forming both the shaft contact force device and the guide contact force device in such a manner that one force component of the contact force device acts on the rotor contact surface of the shaft as the shaft contact force and one force component acts on the stator contact surface as the guide contact force.

In this embodiment of the invention, the contact force device serves not only as the shaft contact force device but also as the guide contact force device because the pre-loading force applied to the contact element at an angle to the longitudinal axis of the contact element by the contact force device is divided into two force components which serve to establish contact of the contact element with both the shaft and the guide.

If, according to a preferred embodiment, the contact force device has a coil spring which has one spring end disposed on a base of the guide and the other end disposed on the contact element, at least one spring end being radially offset from a center axis of the guide, the described division of the pre-loading force into two different force components can be achieved with minimal effort.

In an alternative embodiment of the invention, the contact device is disposed at a contact angle to a rotor radial line of the shaft, and the shaft contact surface of the contact element is inclined at the contact angle relative to a normal plane, which intersects the longitudinal axis of the contact element, in such a manner that the shaft contact surface is disposed in a common contact plane with the rotor contact surface, the contact force device forming both the shaft contact force device and the guide contact force device in such a manner that one force component of the contact force device acts on the rotor contact surface of the shaft as the shaft contact force and one force component acts on the stator contact surface of the guide as the guide contact force.

In this advantageous embodiment, it is thus possible to produce the contact device of the discharging device in a simple manner based on a conventional carbon brush assembly by forming, on an end face of the molded carbon body of the brush assembly, a shaft contact surface which is inclined to the longitudinal axis of the contact element and which is brought into flat contact with the shaft.

In another alternative embodiment, the contact device is disposed on a rotor radial line of the shaft, the shaft contact surface of the contact element is inclined at an contact angle relative to a normal plane which intersects the longitudinal axis of the contact element, and the rotor contact surface is a conical surface having a cone angle that corresponds to the contact angle in such a manner that the shaft contact surface is disposed in a common contact plane with the rotor contact surface in such a manner that the contact force device forms both the shaft contact force device and the guide contact force device and one force component of the contact force device acts on the rotor contact surface of the shaft as the shaft contact force and one force component acts on the stator contact surface of the guide as the guide contact force.

In this way, it is made possible for the contact device to be disposed perpendicular to the longitudinal axis of the shaft, with a contact force component for establishing electrical contact between a guide contact surface of the contact element and a stator contact surface being generated by combination with a rotor contact surface which has a cone angle that corresponds to the contact angle.

The rotor contact surface can be formed directly on the surface of the shaft by a cone-shaped shaft portion or by an outer surface of a contact hub disposed on the shaft. The latter in particular offers the advantage that the materials of the contact hub and of the contact element can be coordinated.

In another advantageous embodiment, the contact device is offset parallel to the longitudinal axis $L_W$ of the shaft and radial to a shaft collar or shaft end, a rotor contact surface which is inclined at a contact angle to a rotor radial line being formed on the shaft collar or on the shaft end, the shaft contact surface of the contact element being inclined at a contact angle relative to a normal plane, which intersects the longitudinal axis of the contact element, in such a manner that the shaft contact surface is disposed in a common contact plane with the rotor contact surface, the contact force device forming both the shaft contact force device and the guide contact force device in such a manner that one force component of the contact force device acts on the rotor contact surface of the shaft as the shaft contact force and one force component acts on the stator contact surface of the guide as the guide contact force.

In another embodiment, the contact device is disposed on a shaft collar or shaft end at a contact angle to the longitudinal axis of the shaft, a rotor contact surface which is inclined at a contact angle to a rotor radial line being formed on the shaft collar or on the shaft end in such a manner that the shaft contact surface is disposed in a common contact plane with the rotor contact surface and is inclined at a contact angle to a normal plane of the contact element, the contact force device forming both the shaft contact force device and the guide contact force device in such a manner that one force component of the contact force device acts on the rotor contact surface of the shaft as the shaft contact force and one force component acts on the stator contact surface of the guide as the guide contact force.

In basically all embodiments of the discharging device, the contact element may be provided with an electrically conductive coating on at least its guide contact surface in order to minimize contact resistance between the guide contact surface formed at the circumference of the contact element and the stator contact surface of the guide.

Likewise, the guide can be provided with an electrically conductive coating at least in the area of the stator contact surface in basically all embodiments of the discharging device in order to thus minimize contact resistance.

It is also particularly advantages if the coating is provided with another capacitive metallic or metalloid coating. Furthermore, it may also prove advantageous if a cable connection is provided between the contact element and the guide or if additional contact between the contact element and the guide aside from the contact formed via the guide contact surface is provided between the guide contact surface or the conductive coating formed on the guide contact surface and the guide by way of a cable connection. Said cable connection primarily serves to discharge low-frequency currents or direct currents, wherein a high-frequency wire suitable to discharge high-frequency currents in particular should be used if alternating currents are to be discharged so as to suppress an antenna effect to the greatest possible extent.

Advantageous embodiments of the invention are the subject-matter of the other dependent claims.

It proves particularly advantageous if the conductive coating has a metal from a group of metals comprising copper, silver, gold, aluminum, iron, cobalt, nickel, chromium, manganese, zinc, tin, antimony or bismuth as the conductive metal.

Preferably, the conductive coating is a multilayer, the other layer being a capacitive metallic or metalloid layer.

It is also particularly preferred if the contact element, which is a molded carbon body, has particles of ferromagnetic or ferrimagnetic substances aside from iron, cobalt, and nickel as well as preferably oxides of a group comprising the metals iron, nickel, manganese, copper, zinc or chromium and, separately or in combination, spinels of the $AB_2X_4$ type, with the letters A (divalent) and B (trivalent) representing metal cations having a combined oxidation number of 8 and X being a placeholder for oxygen atoms or sulfur atoms.

Irrespective of the particular design of the contact device of the discharging device, it proves advantageous if the discharging device has multiple contact devices disposed in such a manner that the contact devices are distributed across the circumference of the shaft and radial to the longitudinal axis of the shaft.

BRIEF DESCRIPTION OF THE DRAWING FIGURE

Hereinafter, preferred embodiments of the discharging device are explained in more detail with reference to the drawing.

DETAILED DESCRIPTION OF THE INVENTION

Figure 1:
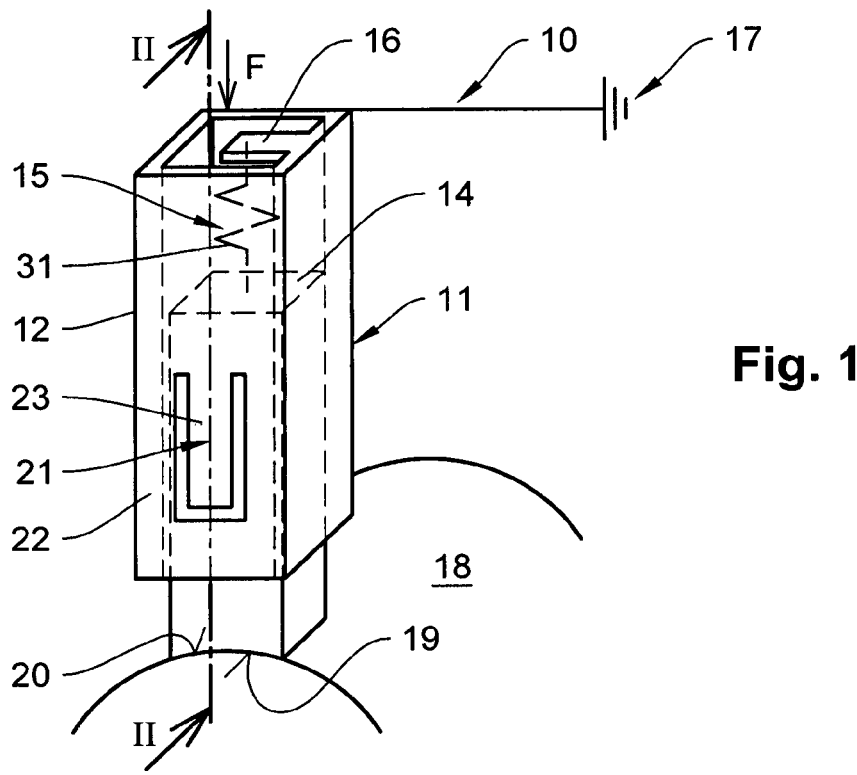
FIG. 1 is an isometric illustration showing a first embodiment of a discharging device.

FIG. 1 shows a discharging device 10 having a contact device 11 which has a guide formed as a guide sleeve 12 and a contact element 13 accommodated in the guide sleeve 12 and being formed by a molded carbon body in the case at hand.

The contact element 13 is accommodated in the guide sleeve 12 in an axially displaceable manner and has a frontal end face 14 located within the guide sleeve 12 and acted on by a pre-loading force F generated by a contact force device 15 in the axial direction. In the case at hand, the contact force device 15 has a coil spring 31 which serves to generate a pre-loading force F and which is disposed under pre-load between the end face 14 of the contact element 13 and a base 16 of the guide sleeve 12, said base 16 being a protruding support tab in this case. The pre-load of the coil spring 31 is generated by suitable relative disposition of the contact device 11 between a stator part 17 of a machine (not shown), said stator part 17 forming a ground in circuitry terms, and a shaft 18, said shaft 18 forming a rotor part of the machine and constituting a conductor in circuitry terms. An alternating current can be discharged from the shaft 18 to the ground or stator part 17 of the machine via the contact device 11.

Since the contact element 13 is disposed so as to be pre-loaded in the axial direction between the base 16 of the guide sleeve 12 and the shaft 18, electrical contact is established between a frontal shaft contact surface 19 of the contact element 13 and a rotor contact surface 20 of the shaft 18 formed at the circumference of the shaft 18.

Figure 2:
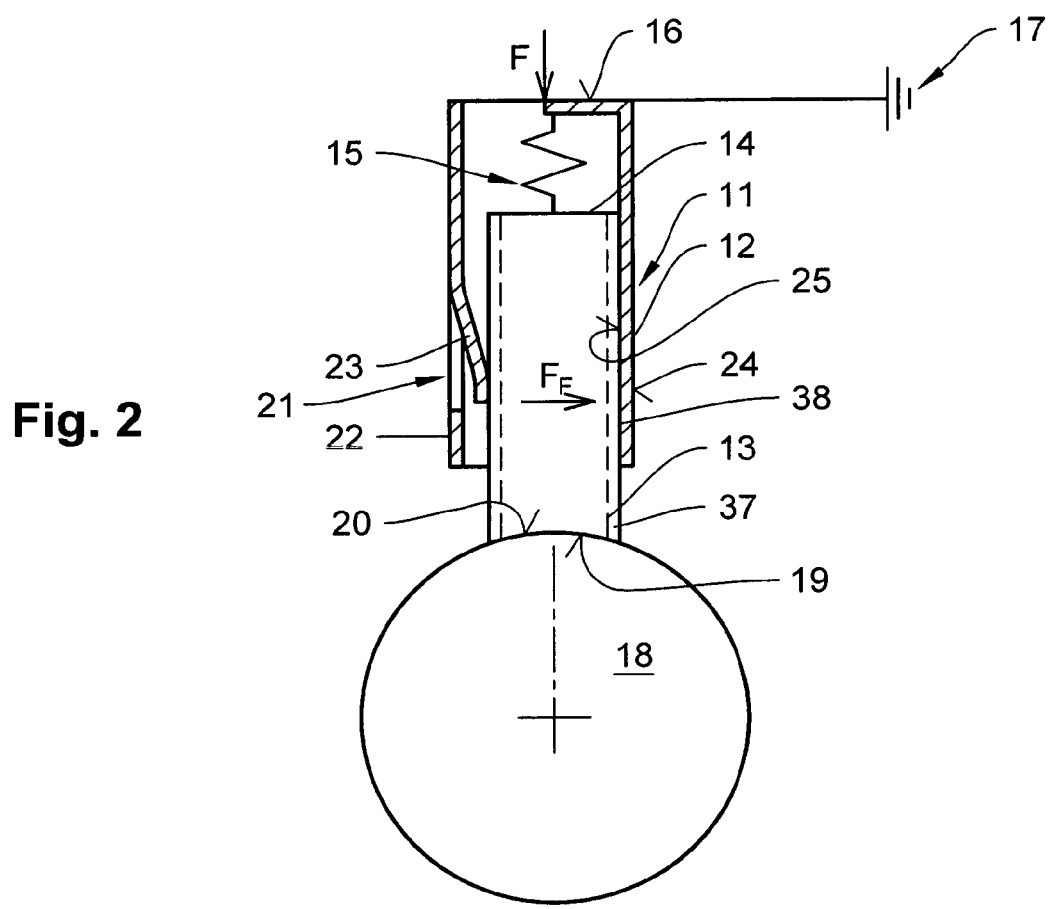
FIG. 2 is a sectional view of the discharging device of FIG. 1 along line II-II in FIG. 1.

In addition to the contact force device 15, which, as explained above, allows electrical contact between the contact element 13 and the shaft 18, the discharging device 10 illustrated in FIGS. 1 and 2 is provided with a guide contact force device 21 which has an elastic spring tab 23 on a first wall portion 22 of the guide sleeve 12, said spring tab 23 being in contact with the contact element 13 under pre-load in such a manner that the contact element 13 is pushed against a wall portion 38 opposite the first wall portion 22 with a guide contact force $F_F$ in such a manner that, in addition to the shaft contact, a stator contact is established between a guide contact surface 24 of the contact element 13 and an opposite stator contact surface 25 of the guide sleeve 12, and thus an electrically conductive connection is formed between the guide contact surface 24 of the contact element 13 and the stator part 17 via the guide sleeve 12 electrically connected to the stator part 17.

Thus, in particular alternating currents that are discharged from the shaft 18 and concentrated in an edge zone 37 of the contact element 13 formed at the circumference of the contact element 13 are transferred into the guide sleeve 12 using the shortest route via the guide contact surface 24 formed at the circumference of the contact element 13, the guide sleeve 12 itself being connected to the stator part 17.

Figure 3:
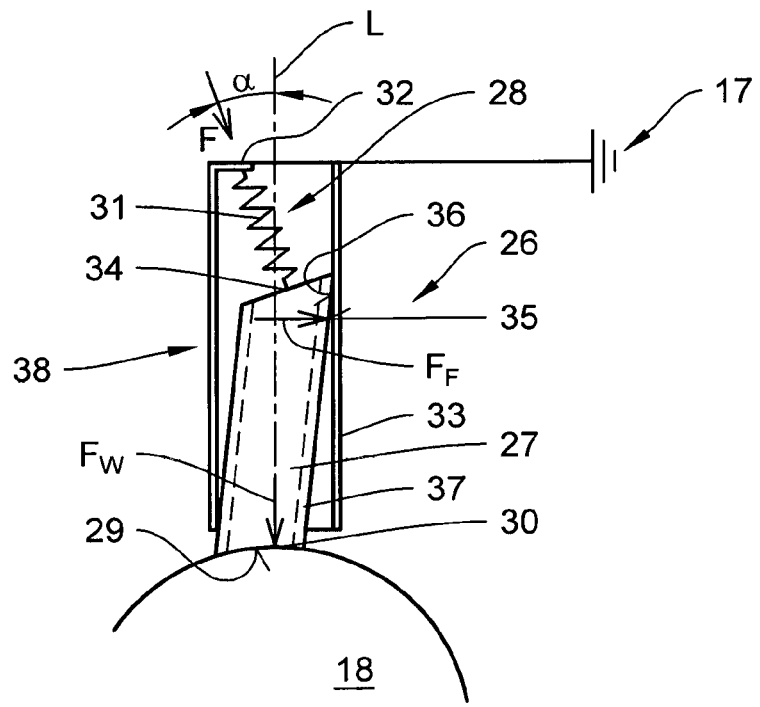
FIG. 3 shows a second embodiment of a discharging device.

FIG. 3 shows a discharging device 26 having a guide of a contact device 38, said guide being realized as a guide sleeve 33, a contact element 27 being accommodated in the guide sleeve 33 and being acted on by a pre-loading force F by means of a contact force device 28 in such a manner that a shaft contact surface 29 of the contact element 27 is in contact with a rotor contact surface 30 of the shaft 18. The contact force device 28, which has a coil spring 31 in the case at hand, which is disposed under pre-load between a base 32, here formed as a support tab, of the guide sleeve 33 and an end face 34 of the contact element 27, generates a pre-loading force F which is oriented at an angle α to the longitudinal axis L of the contact device 11 in such a manner that the pre-loading force F is split into a shaft contact force $F_W$ and a guide contact force $F_F$, the contact force device 28 thus simultaneously serving as both the shaft contact force device for generating the shaft contact force $F_W$ and as the guide contact force device for generating the guide contact force $F_F$. The guide contact force effects a tilting or wedging of the contact element 27 in the guide sleeve 33 in such a manner that a guide contact is formed between a guide contact surface 35 of the contact element 27 and an opposite stator contact surface 36, said guide contact, as illustrated before by way of the embodiment example of the discharging device 10 illustrated in FIGS. 1 and 2, allows alternating currents to be electrically discharged from the edge zone 37 formed at the circumference of the contact element 27 into the stator part 17 via the guide sleeve 33.

Figure 4:
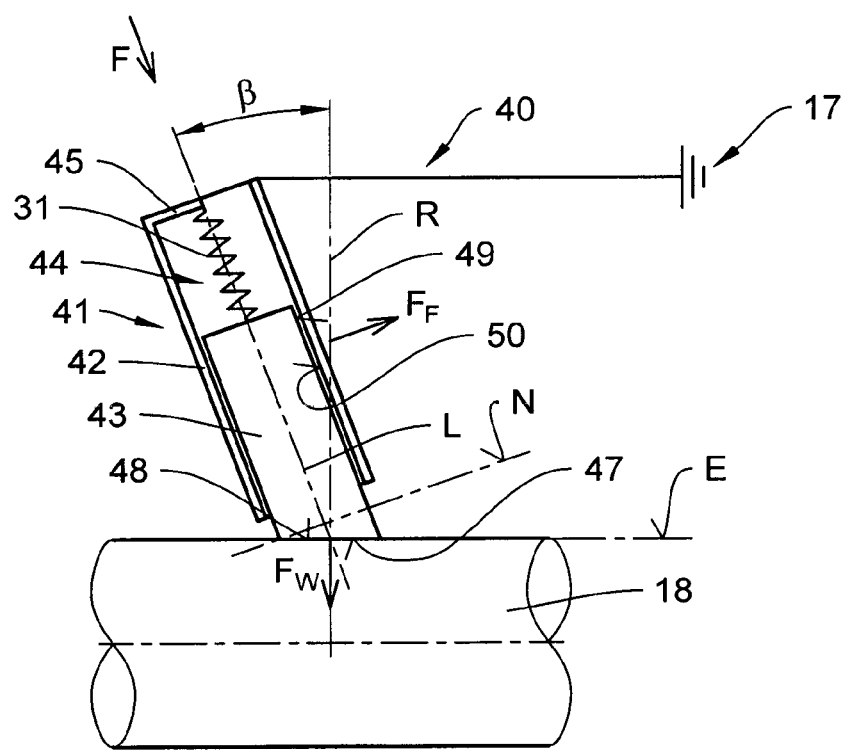
FIG. 4 shows a third embodiment of a discharging device.

FIG. 4 shows another embodiment of a discharging device 40, in which a contact device 41 comprising a contact sleeve 42 and a contact element 43 axially guided in the contact sleeve 42 is disposed at a contact angle β to a rotor radial line R of the shaft 18. A contact force device 44 which, here too, has a coil spring 31 disposed under pre-load between a base 45 of the contact sleeve 42 and an end face 46 of the contact element 43 is provided to apply a pre-loading force F to the contact element 43. A shaft contact surface 47 formed at the end of the contact element 43 protruding out of the contact sleeve 42 is disposed, together with a rotor contact surface 48 formed by the circumference of the shaft 18, in a common contact plane E which is inclined by contact angle β in relation to a normal plane N intersecting the longitudinal axis L of the contact element 43. Since the shaft contact surface 47 is inclined in relation to the normal plane N of the contact element 43, the contact force device 44 forms both a shaft contact force device and a guide contact force device in such a manner that a first force component of the pre-loading force F generated by the contact force device 44 acts as the shaft contact force $F_W$ and a second force component of the pre-loading force F acts as the guide contact force $F_F$ between a guide contact surface 49 and a stator contact surface 50 of the contact sleeve 42.

Figure 5:
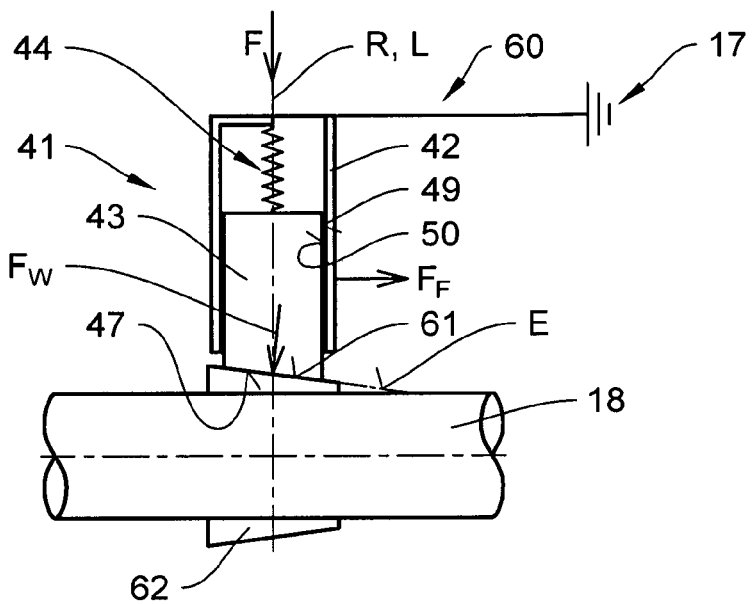
FIG. 5 shows a fourth embodiment of a discharging device.

FIG. 5 shows another embodiment of a discharging device 60, which, in the case at hand, has a contact device 41 that is identical to the contact device 41 of the discharging device 40 illustrated in FIG. 4, which is why the contact device 41 illustrated in FIG. 5 is provided with the same reference signs as the contact device 41 of FIG. 4 regarding its components.

In contrast to the discharging device 40 illustrated in FIG. 4, the contact device 41 of discharging device 60 is disposed on a rotor radial line R of the shaft 18, the longitudinal axis L of the contact device 41 thus coinciding with the rotor radial line R, as illustrated in FIG. 5.

Another difference between the discharging device 60 illustrated in FIG. 5 and the discharging device 40 illustrated in FIG. 4 is that in the case of discharging device 60, a rotor contact surface 61 being in contact with the shaft contact surface 47 is not formed directly by the circumference of the shaft 18; instead, a contact hub 62 is disposed on the shaft 18 in order to form the rotor contact surface 61, said contact hub 62 having a conical surface, the rotor contact surface 61 thus being formed by the outer surface of the contact hub 62.

Owing to the inclined contact plane E formed between the shaft contact surface 47 and the rotor contact surface 61, the contact force device 44 acts as both the shaft contact force device and the guide contact force device in such a manner that one force component $F_W$ of the pre-loading force F generated by the contact force device 44 acts on the rotor contact surface 61 of the shaft 18 as the shaft contact force $F_W$ and one force component $F_F$ acts as the guide contact force $F_F$ between the guide contact surface 49 of the contact element 43 and the stator contact surface 50 of the contact sleeve 42.

Figure 6:
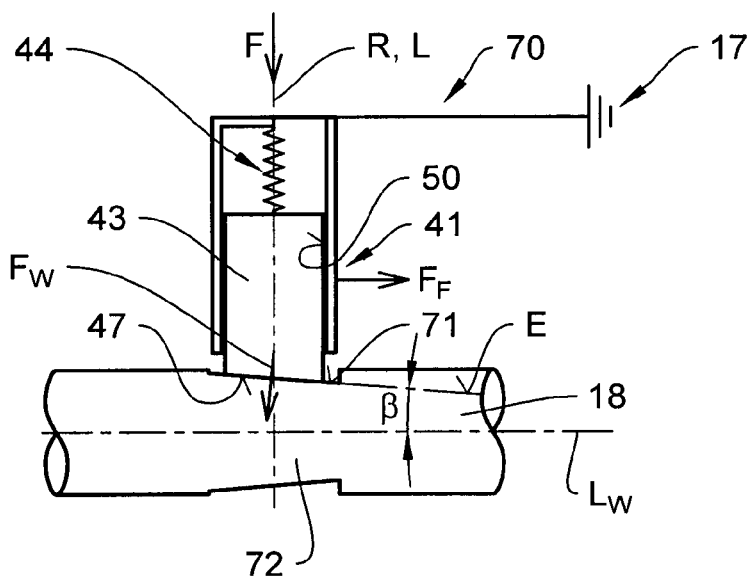
FIG. 6 shows a fifth embodiment of a discharging device.

FIG. 6 shows another embodiment of a discharging device 70, which, like the discharging devices 40 and 60 described above with reference to FIGS. 4 and 5, has the contact device 41. As in discharging device 60, the contact device 41 of discharging device 70 is disposed on a rotor radial line R of the shaft 18, the longitudinal axis L thus coinciding with the rotor radial line R.

Discharging device 70 differs from the discharging device 60 illustrated in FIG. 5 in that a rotor contact surface 71 which, corresponding to the shaft contact surface 47 of the contact element 43, is inclined by contact angle β relative to the longitudinal axis $L_W$ of the shaft 18 is formed directly by the circumferential surface of the shaft 18 in such a manner that the shaft 18 has a cone-shaped shaft portion 72.

Figure 7:
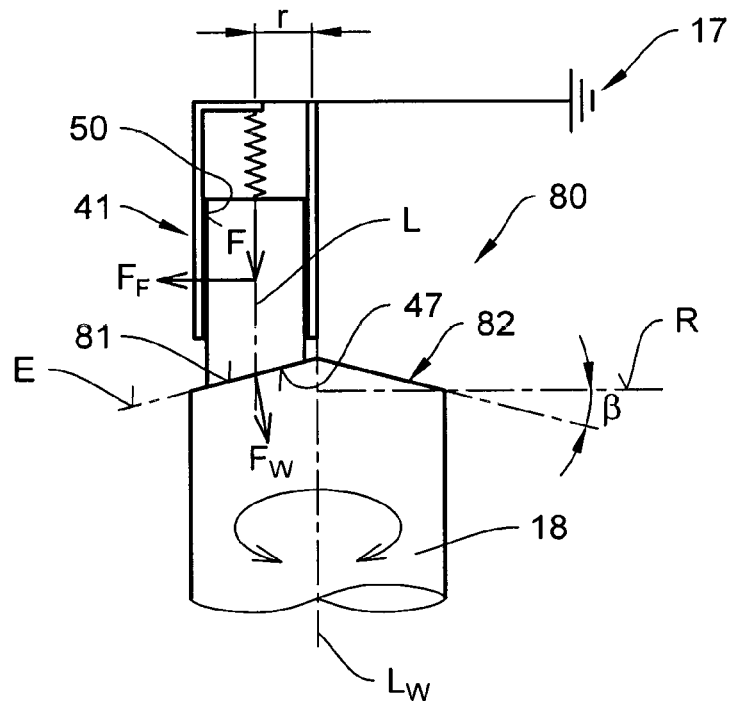
FIG. 7 shows a sixth embodiment of a discharging device.

FIG. 7 shows a discharging device 80 which is also provided with a contact device 41 whose contact element 43, as explained in detail before in particular with reference to the discharging device 40 illustrated in FIG. 4, has a shaft contact surface 47 which is in contact with a rotor contact surface 81 of the shaft 18 in a contact plane E inclined by contact angle β relative to a normal plane N intersecting the longitudinal axis $L_K$ of the contact element 43, said rotor contact surface 81 being formed by a truncated axial shaft end 82 of the shaft 18 in the case at hand. The contact device 41 is disposed at a radial offset r parallel to the longitudinal axis $L_W$ of the shaft 18.

Figure 8:
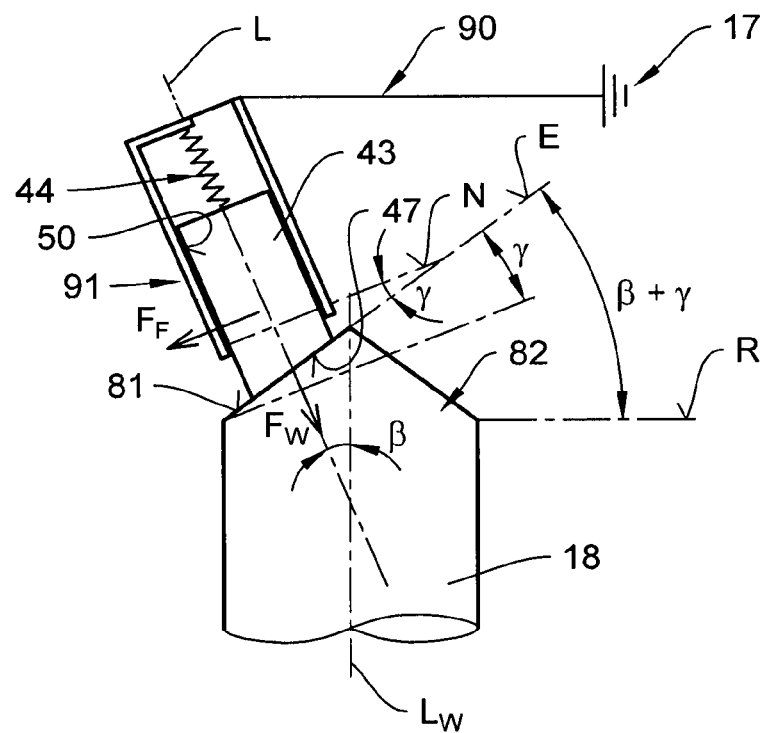
FIG. 8 shows a seventh embodiment of a discharging device.

FIG. 8 shows another embodiment of a discharging device 90, which has a contact device 91 which is identical to the contact device 41 explained above and which, therefore, is otherwise provided with the same reference signs for identical components.

In the case at hand, an inclined contact plane E is formed between the contact element 43 and the shaft end 82 of the shaft 18 by disposing the contact device 91 at an axial offset from the shaft end 82 at a contact angle β to the longitudinal axis $L_W$ of the shaft 18 and by disposing the shaft contact surface 47 at a contact angle γ to a normal plane N of the contact element 43. As a result, the pre-loading force F generated by the contact force device 44 is divided into a force component of the pre-loading force F that acts on the rotor contact surface 81 as the shaft contact force $F_W$ and a force component of the pre-loading force F that acts on the stator contact surface 50 of the guide sleeve 42 as the guide contact force $F_F$.

A substantial contribution to the discharge and attenuation of high-frequency electromagnetic interference is also provided by the internal structure of the contact elements 13, 27, 43 as molded carbon bodies containing graphite or another carbon modification as the main volume fraction. Since the contact elements 13, 27, 43 have to conduct only small currents during interference suppression, the contact elements 13, 27, 43 do not have to contain a large amount of a highly conductive component, such as copper or silver. Also, it is advantageous if ferro-magnetic or ferrimagnetic substances are dispersed inside the contact elements 13, 27, 43. Aside from iron, cobalt and nickel, such substances comprise various oxides of the elements iron (FeO, $Fe_2O_3$, $Fe_3O_4$), nickel (NiO), manganese (MnO, $MnO_2$, $Mn_2O_3$, $Mn_3O_4$), chromium ($CrO_2$, $Cr_2O_3$), copper (CuO, $Cu_2O$) and zinc (ZnO), but also compounds from the class of spinels, which are of the type $AB_2X_4$, with A (divalent cations) and B (trivalent cations) representing metal cations having a combined oxidation number of 8 and X being a placeholder for oxygen atoms or sulfur atoms.

There are different options regarding the distribution of these particles in the contact elements 13, 27, 43: in a simple embodiment, the particles can be distributed homogeneously across the entire volume. Oftentimes, powder-metallurgical production of the contact elements 13, 27, 43 by compression molding results in texturing or anisotropy because particles tend to align parallel to the press surface. This effect can be amplified by targeted introduction of anisotropic particles. Another kind of anisotropy can be achieved by introducing short fibers, which can also be aligned through specific molding techniques (such as extrusion).

When ferromagnetic or ferrimagnetic particles are used, it is particularly advantageous if the molded carbon body of the contact elements 13, 27, 43 has two different mixtures, one of which has either none or only very few of these particles, while the other one has a very large number of these particles. In this way, a mixture without magnetic particles can be selected for an area of wear of the contact elements 13, 27, 43, which will be worn over the duration of their use, and the non-wearing end portion of the contact elements can be provided with a large content of magnetic particles.

In another embodiment of the molded carbon body, the concentration of the magnetic particles shows a gradient rising from the shaft contact surface of the contact elements 13, 27, 43 to the opposite end portion.

The invention claimed is:

1. A discharging device (10, 26, 40, 60, 70, 80, 90) for discharging electrical interference from a rotor part of a machine a stator part (17) of the machine, the discharging device having a contact device (11, 41, 91) comprising a contact element (13, 27, 43) accommodated in an axially displaceable manner in a guide and acted on by a contact force device (15, 28, 44) for generating a shaft contact force FW in order to establish electrical contact between a shaft contact surface (19, 29, 47, 92) of the contact element (13, 27, 43) and a rotor contact surface (20, 30, 48, 61, 71, 81) of the shaft (18), characterized in that the guide has a stator contact surface (25, 36, 50) for forming an electrical connection with the stator part (17) and the discharging device has a guide contact force device (21) for generating a guide contact force FF between a guide contact surface (24, 35, 49) of the contact element (13, 27, 43) and the stator contact surface (25, 36, 50) electrically connected to the stator part (17);

wherein the contact force device (15, 28, 44) has a pre-loading device disposed on a base (16, 32, 45) of the guide, the contact device (41) is disposed at a contact angle β to a rotor radial line R of the shaft (18) and the shaft contact surface (47) of the contact element (43) is inclined at contact angle β relative to a normal plane N, the normal plane N intersects the longitudinal axis L of the contact element (43), in such a manner that the shaft contact surface (47) is disposed in a common contact plane E with the rotor contact surface (48), the contact force device (44) forming both the shaft contact force device and the guide contact force device in such a manner that one force component of the contact force device (44) acts on the rotor contact surface (48) of the shaft (18) as the shaft contact force FW and one force component acts on the stator contact surface (50) of the guide as the guide contact force FF, and the contact device (41) is disposed at an offset parallel to the longitudinal axis LW of the shaft (18) and radial to a shaft collar or shaft end, a rotor contact surface (82) inclined at a contact angle β to a rotor radial line R being formed at the shaft collar or at the shaft end, the shaft contact surface (47) of the contact element (43) being inclined at contact angle β relative to a normal plane N, which intersects the longitudinal axis L of the contact element (43), in such a manner that the shaft contact surface (47) is disposed in a common contact plane E with the rotor contact surface (48), the contact force device (44) forming both the shaft contact force device and the guide contact force device in such a manner that one force component of the contact force device acts on the rotor contact surface (82) of the shaft (18) as the shaft contact force FW and one force component acts on the stator contact surface (50) of the guide as the guide contact force FF.

2. The discharging device according to claim 1, characterized in that the guide is a contact sleeve (12, 42) having two diametrically opposed wall portions, a first wall portion (22) being provided with the guide contact force device and the opposite second wall portion being a stator contact surface (25).

3. The discharging device according to claim 2, characterized in that the first wall portion (22) is provided with a spring tab (23) which is in elastic contact with the contact element (13) so as to form the guide contact force device (21).

4. The discharging device according to claim 1, characterized in that the guide is a contact sleeve (42) and the contact force device (44) acts on the contact element (43) with a pre-loading force F oriented at an angle β to the longitudinal axis L of the contact element (43), the contact force device (44) forming both the shaft contact force device and the guide contact force device in such a manner that one force component of the contact force device acts on the rotor contact surface (48, 61, 71, 81) as the shaft contact force FW and one force component acts on the stator contact surface (50) as the guide contact force FF.

5. The discharging device according to claim 4, characterized in that the contact force device (28) has a coil spring (31) which has one spring end disposed on a base (32) of the guide and the other spring end disposed on the contact element (27), at least one spring end being radially offset from a center axis L of the guide (33) which is a contact sleeve (33).

6. The discharging device according to claim 1, characterized in that the contact device (41) is disposed on a rotor radial line R of the shaft (18), the shaft contact surface (47) of the contact element (43) is inclined at a contact angle β relative to a normal plane N, the normal plane (N) intersects the longitudinal axis L of the contact element (43), and the rotor contact surface is a conical surface having a cone angle which corresponds to the contact angle in such a manner that the shaft contact surface (47) is disposed in a common contact plane E with the rotor contact surface (61) in such a manner that the contact force device forms both the shaft contact force device and the guide contact force device and one force component of the contact force device (44) acts on the rotor contact surface (61, 71) of the shaft as the shaft contact force FW and one force component acts on the stator contact surface (50) of the guide as the guide contact force FF.

7. The discharging device according to claim 6, characterized in that the rotor contact surface (61) is formed by an outer surface of a contact hub (62) disposed on the shaft (18).

8. The discharging device according to claim 6, characterized in that the rotor contact surface (71) is formed by a cone-shaped shaft portion (72).

9. The discharging device according to claim 1, characterized in that the contact device (41) is disposed on a shaft collar or a shaft end at a contact angle β to the longitudinal axis LW of the shaft, a rotor contact surface (82) inclined at contact angle β+γ to a rotor radial line R being formed at the shaft collar or at the shaft end in such a manner that the shaft contact surface (47) is disposed in a common contact plane E with the rotor contact surface (81) and is inclined at a contact angle to a normal plane of the contact element, the contact force device (44) forming both the shaft contact force device and the guide contact force device in such a manner that one force component of the contact force device acts on the rotor contact surface (82) of the shaft (18) as the shaft contact force FW and one force component acts on the stator contact surface (50) of the guide as the guide contact force FF.

10. The discharging device according to claim 1, characterized in that the contact element (13, 27, 43) is provided with an electrically conductive coating on at least its second guide contact surface (24, 35, 49).

11. The discharging device according to claim 1, characterized in that the coating is provided with another capacitive metallic or metalloid coating.

12. The discharging device according to claim 1, characterized in that a cable connection is provided between the contact element and the guide.

13. The discharging device according to claim 10, characterized in that a cable connection is provided between the conductive coating of the contact element and the guide.

14. The discharging device according to claim 1, characterized in that the contact element (13, 27, 43) has ferromagnetic or ferrimagnetic substances aside from iron, cobalt or nickel from the group comprising FeO, Fe2O3, Fe3O4, nickel oxides, NiO, manganese oxides from the group comprising MnO, MnO2, Mn2O3, Mn3O4, chromium oxides from the group comprising CrO2, Cr2O3, copper oxides from the group comprising CuO, Cu2O, or zinc oxides, both separately or in combination with each other, or compounds from the class of spinels, which are of the type AB2X4, with A (divalent cations) and B (trivalent cations) representing metal cations having a combined oxidation number of 8 and X being a placeholder for oxygen atoms or sulfur atoms.

15. The discharging device according to claim 14, characterized in that the ferromagnetic or ferrimagnetic substances are distributed homogenously.

16. The discharging device according to claim 1, characterized in that the ferromagnetic or ferrimagnetic substances have an orientation or are disposed in multiple layers.

17. The discharging device according to claim 16, characterized in that the distribution of the ferromagnetic or ferrimagnetic substances in the contact element (13, 27, 43) shows a gradient.

18. A discharging device (10, 26, 40, 60, 70, 80, 90) for discharging electrical interference from a rotor part of a machine-into a stator part (17) of the machine, the discharging device having a contact device (11, 41, 91) comprising a contact element (13, 27, 43) accommodated in an axially displaceable manner in a guide and which is acted on by a contact force device (15, 28, 44) for generating a shaft contact force FW in order to establish electrical contact between a shaft contact surface (19, 29, 47, 92) of the contact element (13, 27, 43) and a rotor contact surface (20, 30, 48, 61, 71, 81) of the shaft (18), characterized in that the guide has a stator contact surface (25, 36, 50) for forming an electrical connection with the stator part (17) and the discharging device has a guide contact force device (21) for generating a guide contact force FF between a guide contact surface (24, 35, 49) of the contact element (13, 27, 43) and the stator contact surface (25, 36, 50) electrically connected to the stator part (17);

wherein the contact force device (15, 28, 44) has a preloading device disposed on a base (16, 32, 45) of the guide, the contact device (41) is disposed at a contact angle β to a rotor radial line R of the shaft (18) and the shaft contact surface (47) of the contact element (43) is inclined at contact angle β relative to a normal plane N, the normal plane N intersects the longitudinal axis L of the contact element (43), in such a manner that the shaft contact surface (47) is disposed in a common contact plane E with the rotor contact surface (48), the contact force device (44) forming both the shaft contact force device and the guide contact force device in such a manner that one force component of the contact force device (44) acts on the rotor contact surface (48) of the shaft (18) as the shaft contact force FW and one force component acts on the stator contact surface (50) of the guide as the guide contact force FF, and the contact device (41) is disposed on a shaft collar or shaft end at a contact angle β to the longitudinal axis LW of the shaft, a rotor contact surface (82) inclined at contact angle β+γ to a rotor radial line R being formed at the shaft collar or at the shaft end in such a manner that the shaft contact surface (47) is disposed in a common contact plane E with the rotor contact surface (81) and is inclined at a contact angle to a normal plane of the contact element, the contact force device (44) forming both the shaft contact force device and the guide contact force device in such a manner that one force component of the contact force device acts on the rotor contact surface (82) of the shaft (18) as the shaft contact force FW and one force component acts on the stator contact surface (50) of the guide as the guide contact force FF.

* * * * *

UNITED STATES PATENT AND TRADEMARK OFFICE
CERTIFICATE OF CORRECTION

PATENT NO. : 11,121,608 B2
APPLICATION NO. : 16/318850
DATED : September 14, 2021
INVENTOR(S) : Huber et al.

Page 1 of 1

It is certified that error appears in the above-identified patent and that said Letters Patent is hereby corrected as shown below:

In the Claims

Column 9, Claim 1, Line 24 – please replace "machine a stator part (17) of the machine," with
--- machine into a stator part (17) of the machine, ---

Signed and Sealed this
First Day of March, 2022

Drew Hirshfeld
*Performing the Functions and Duties of the
Under Secretary of Commerce for Intellectual Property and
Director of the United States Patent and Trademark Office*